United States Patent [19]

Press

[11] Patent Number: 4,522,432

[45] Date of Patent: Jun. 11, 1985

[54] COMPONENTS FOR LINED PIPING SYSTEM WITH ANCHORED LINERS AND METHOD OF MANUFACTURE

[75] Inventor: Irving D. Press, West Orange, N.J.

[73] Assignee: UMC Industries, Inc., Stamford, Conn.

[21] Appl. No.: 554,531

[22] Filed: Nov. 23, 1983

Related U.S. Application Data

[63] Continuation-in-part of Ser. No. 370,481, Apr. 21, 1982, abandoned.

[51] Int. Cl.³ ............................................. F16L 9/14
[52] U.S. Cl. .................................... 285/55; 285/149; 285/156; 29/157 T; 138/147
[58] Field of Search .................... 285/156, 55, 149; 29/157 T, 463, 469, DIG. 48; 138/147, 141, 140, 143, 174, DIG. 3

[56] References Cited

U.S. PATENT DOCUMENTS 4,267,863  5/1981  Burelle .......................... 285/114 X Primary Examiner—Richard J. Scanlan, Jr.
Attorney, Agent, or Firm—Hopgood, Calimafde, Kalil, Blaustein & Judlowe

[57] ABSTRACT

Molded plastic liners for pipe spools and fittings are provided with embedded structural anchors having externally projecting parts that are secured to the metal housing by various mechanical fastening arrangements. In a series of embodiments they are welded into the welded seams of the metal housing for the component. Operation under high vacuum is ensured without liner constriction.

17 Claims, 17 Drawing Figures

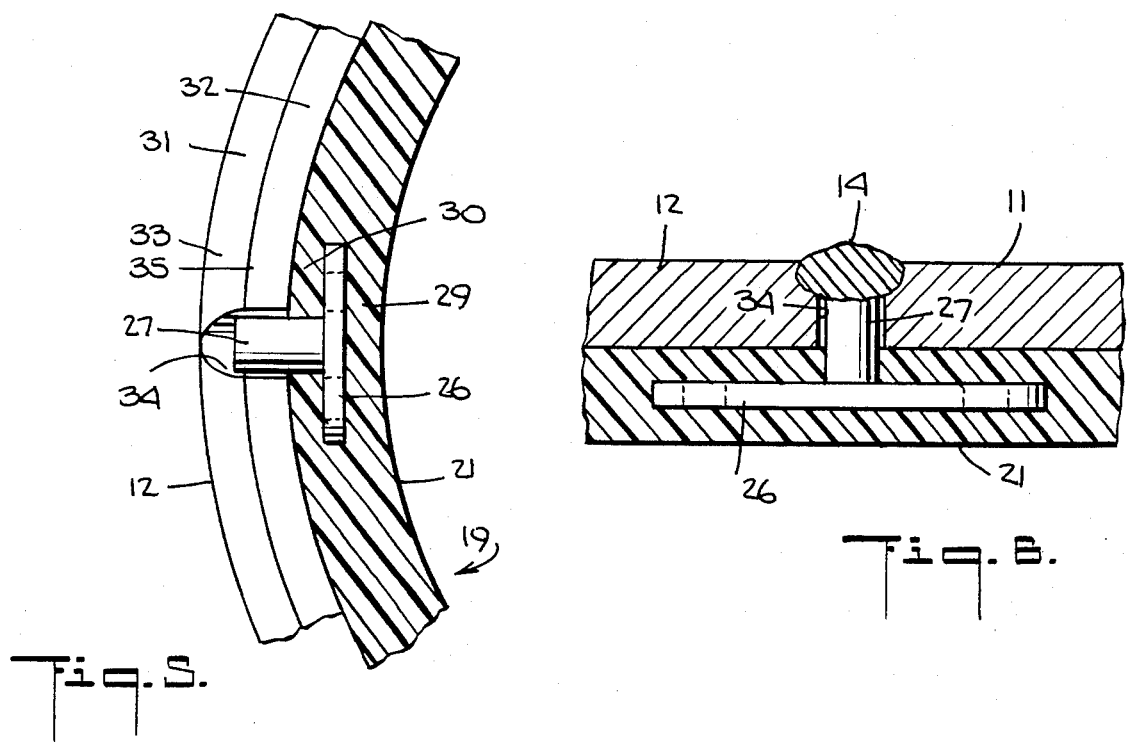
Fig. 5.
Fig. 6.
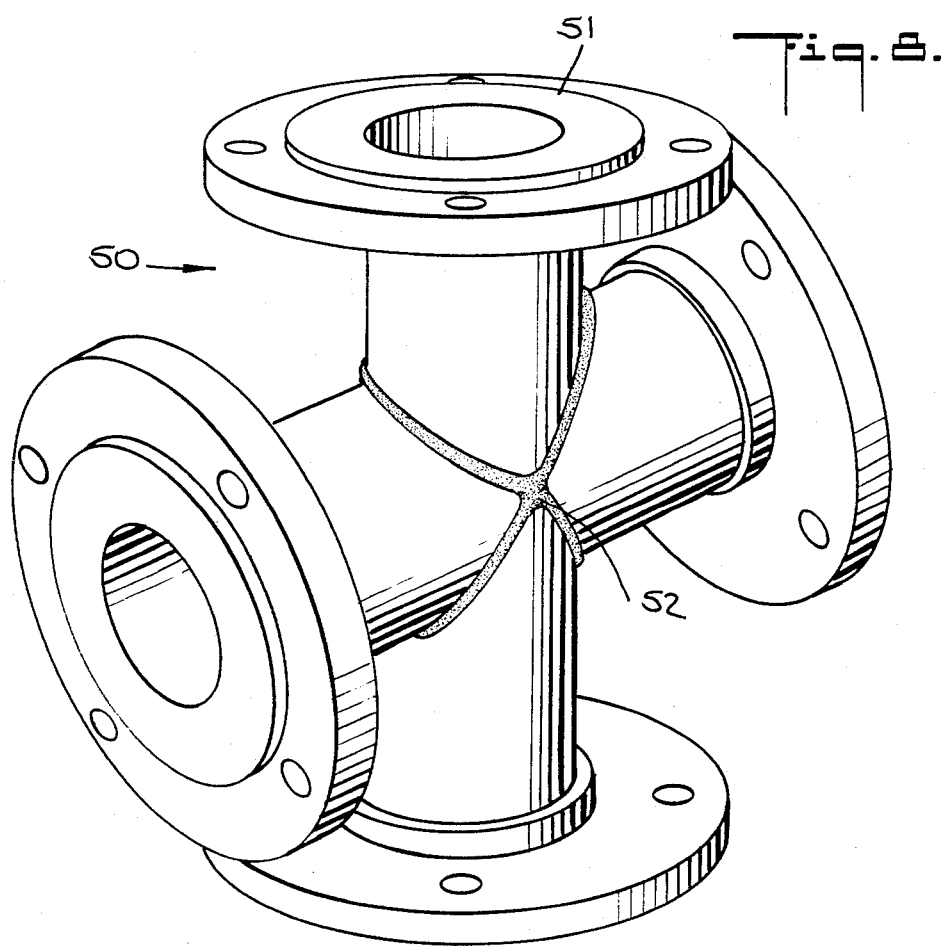
Fig. 8.

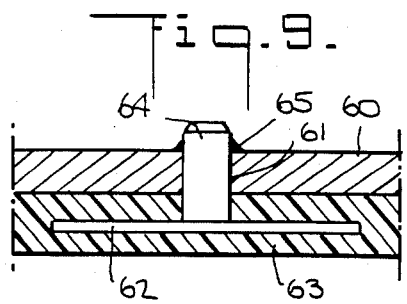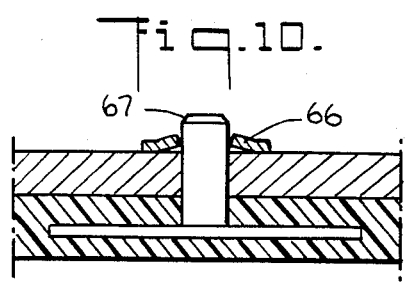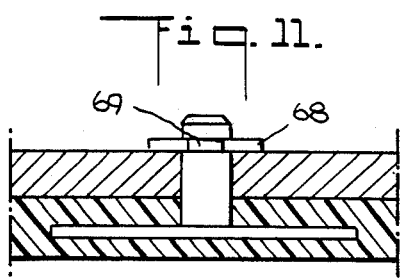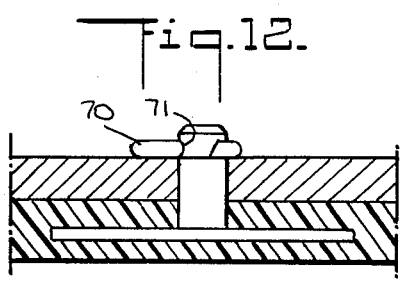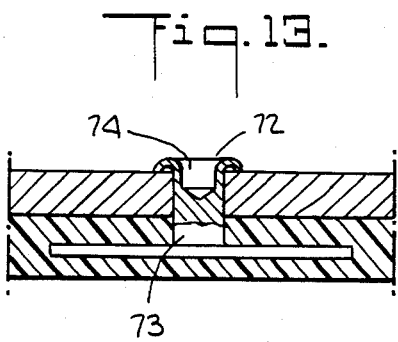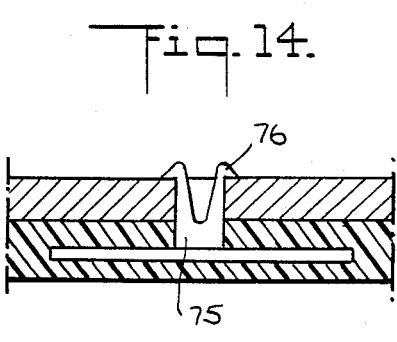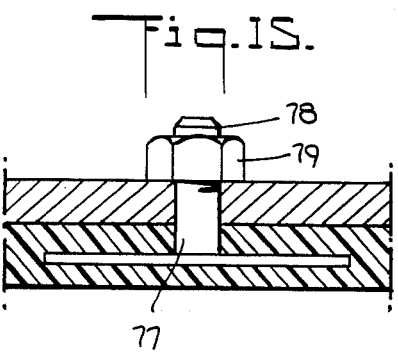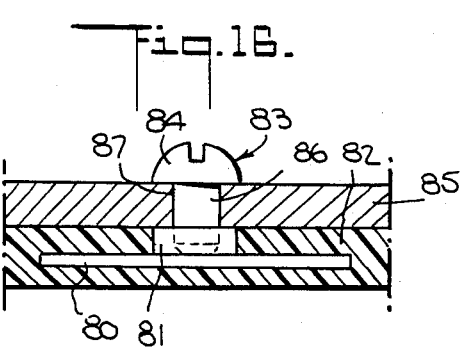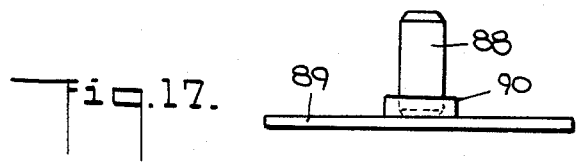

COMPONENTS FOR LINED PIPING SYSTEM WITH ANCHORED LINERS AND METHOD OF MANUFACTURE

BACKGROUND OF THE INVENTION

This application is a continuation-in-part of application Ser. No. 370,481, filed Apr. 21, 1982 now abandoned.

The present invention relates to components for lined piping systems and, more particularly, to metal pipe spools and fittings lined with non-metallic material intended for service including, inter alia, vacuum service.

Metal pipe lined with non-metallic material, usually a thermoplastic substance, has been known for considerable time and is in widespread use for handling diverse materials spanning the gamut from corrosive acid to food. One form of such pipe comprises a housing of metal, usually steel, lined with an extrusion molded layer of a thermoplastic resin. Generally, the lining can be produced economically with sufficient wall thickness and, depending upon the plastic, with locked in stresses such that even in large diameter pipe sections the plastic will be able to resist collapsing when subjected to high vacuum service. Under certain circumstances, however, particularly as the pipe diameter gets larger, inordinately thick linings are required and the known methods are no longer practical. Moreover, when it comes to the branch fittings for such pipe, the branch openings of the tees, crosses and wyes, for example, so weaken the liner and interrupt the hoop section that uneconomical thickness is required to resist high vacuum service collapse.

Vacuum service collapse of the liner has been of particular concern with fittings, including elbows, and to a lesser extent with spools, lined with one of the fluorocarbon resins, among which are PTFE, FEP, PFA and PVDF, or polypropylene for sizes of 6" and greater. In a somewhat related environment, namely that of a constrictable tube valve, vacuum resistance has been provided by securing the tube to the valve compressor members by interconnecting links. Details of such arrangement are disclosed and claimed in my U.S. Pat. No. 3,791,617, issued Feb. 12, 1974, entitled "Positive Opening and Closing Constrictable Tube Valve With Means For Prolonging Tube Life," and assigned to the same assignee as the present invention.

SUMMARY OF THE INVENTION

It has now been discovered that it is possible to embed an anchor in the wall of a molded liner for a pipe spool or fitting and to secure an externally projecting portion of said anchor to the wall of the surrounding metal housing by various means including that of welding without significantly deteriorating or interfering with the integrity of the plastic material.

In accordance with one aspect of the present invention there is provided a component for a lined piping system comprising a metal housing lined with a non-metallic liner of molded material, and at least one structural anchor having a first part embedded and anchored in said liner and having a second part projecting from said liner and secured to said housing.

In accordance with a further aspect of the present invention there is provided a method for fabricating the foregoing component, comprising in combination the steps of selecting a liner for said component molded of non-metallic material and having at least said one anchor with said first part thereof embedded in said non-metallic material of said liner and said second part projecting from a radially outer surface of said liner, assembling said housing about said liner, and securing said housing to said second part of said anchor.

BRIEF DESCRIPTION OF THE DRAWINGS

The invention will be better understood after reading the following detailed description of the presently preferred embodiments thereof with reference to the appended drawings in which:

FIG. 5 is a fragmentary view of the stud portion of the anchor in assembled position relative to the sections of the housing prior to a welding operation;

FIG. 6 is a view similar to FIG. 5, but after the welding operation;

FIG. 8 is a perspective view of a cross embodying the present invention,

FIG. 9 is a fragmentary sectional view, somewhat similar to FIG. 6, showing another embodiment of the invention wherein the anchor has a stud that projects through an aperture in a wall of the housing and is secured to the housing by welding;

FIG. 10 is a view, similar to FIG. 9, of another embodiment wherein the anchor stud is secured to the housing by a barbed washer;

FIG. 11 is of a modification wherein the stud is secured by a snap ring engaged in a groove;

FIG. 12 is of a modification wherein the stud is secured by a cotter pin passing though a transverse bore;

FIG. 13 is a modification wherein the end of the stud is fashioned as a rivet and is upset;

FIG. 14 is a modification wherein the end of the stud is secured by a laterally spread and staked portion formed with a radially extending lip;

FIG. 15 is a view of a modification wherein the end of the stud is externally threaded and secured by a threaded nut;

FIG. 16 is a view of a still further modification wherein the stud is separate from the anchor plate and takes the form of a headed screw projecting inwardly through the housing and threadedly engaged in an internally threaded bore provided in an anchor plate; and FIG. 17 shows a modification applicable to any of the embodiments of FIGS. 9 to 15 wherein the stud is separate and threadedly joinable to the anchor plate in a manner similar to that in FIG. 16.

The same reference numerals are used throughout the drawings to designate the same or similar parts.

DETAILED DESCRIPTION OF THE PREFERRED EMBODIMENTS

Figure 1:
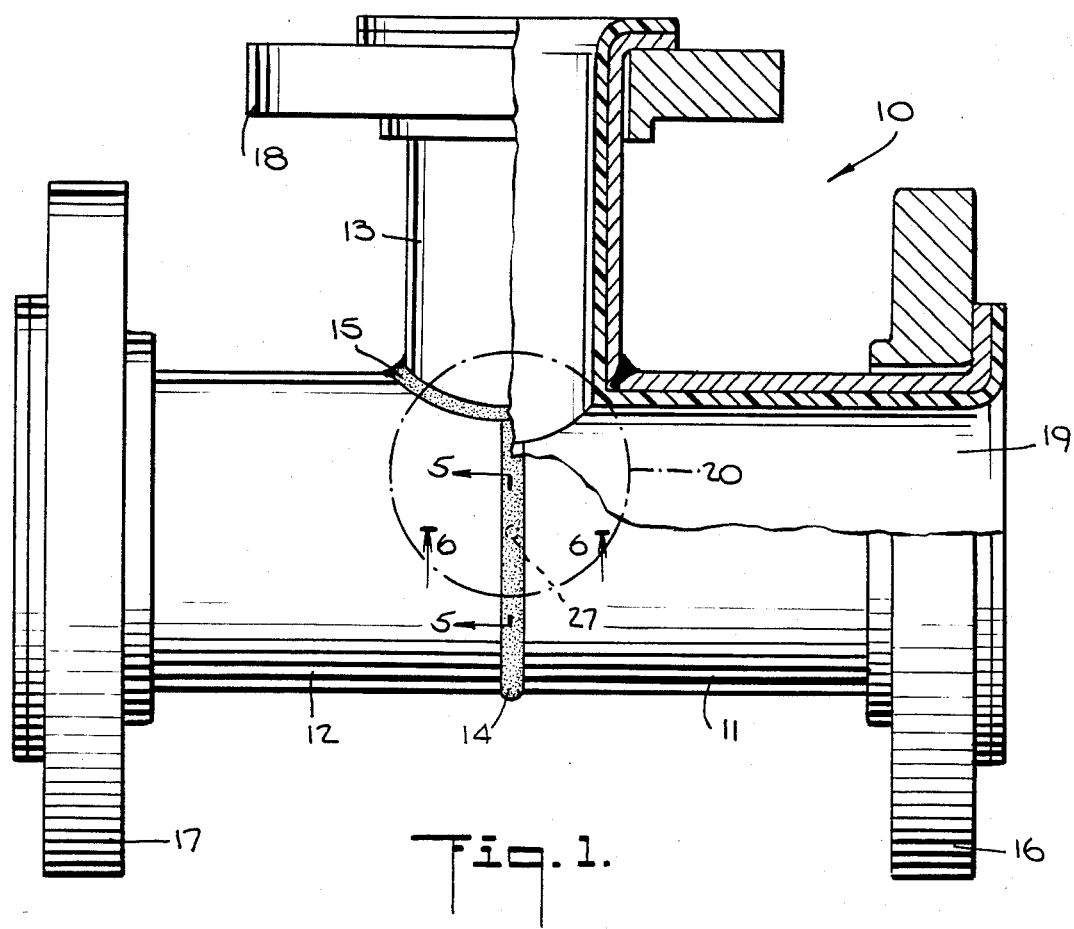
FIG. 1 is an elevational view, partly in section, of a reducing tee embodying the present invention.

Reference should now be had to FIG. 1 wherein is illustrated a reducing tee, 10, embodying the present invention. In this example the tee fitting 10 has a metal housing formed from run stub ends, 11 and 12, and a stack stub end, 13, joined by welded seams, 14 and 15, and provided with Van-Stone flanges 16, 17 and 18. The housing of fitting 10 is lined with a precision preformed liner 19 of molded non-metallic material, e.g., isostatically molded polytetrafluoroethylene (PTFE). As shown, the run and stack ends of the liner 19 extend outwardly of the stub ends 11-13 and are flared radially outwardly over the faces of the flanges formed on the stub ends.

When a fitting such as that just described with reference to FIG. 1 and without more is connected into a piping system and subjected to vacuum conditions, especially in sizes above 6", there is a tendency for the liner 19 to collapse or constrict, with the constriction generally occurring parallel to the plane that contains the seam 14 and the longitudinal axis of the stack stub end 13. The greatest tendency is within the region designated by the phantom line circle 20, although collapse can occur anywhere around the circumference of the run in the vicinity of the seam 14. However, by virtue of a construction now to be described, such failure is prevented.

Figure 2:
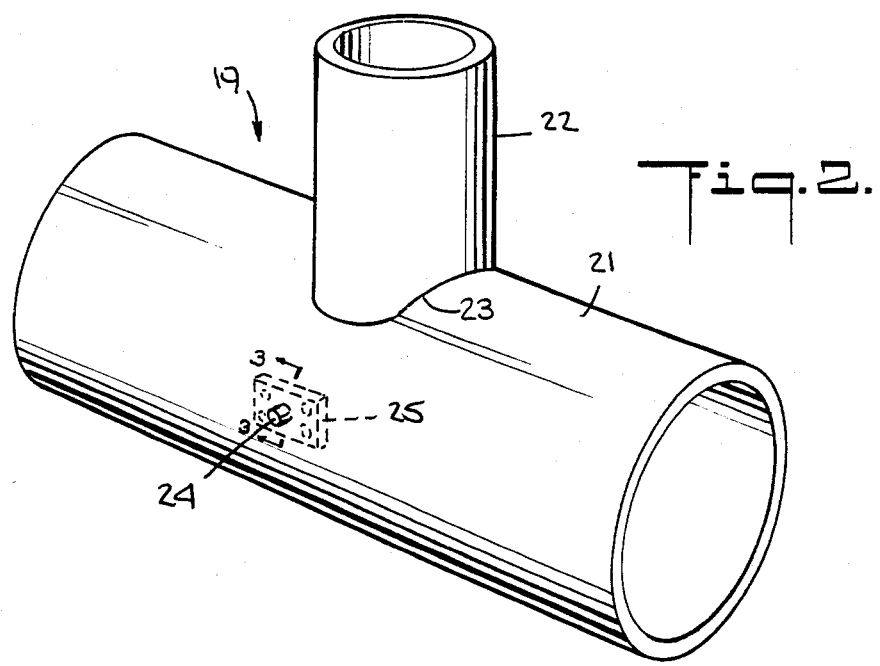
FIG. 2 is a perspective view of the molded liner used in the fabrication of the fitting in FIG. 1.

Referring to FIG. 2 there is shown the liner 19 prior to assembly within its metal housing. Liner 19, being intended for a tee fitting, has a run section 21 and a stack section 22 intersecting at a junction line 23. The lengths of the respective sections of liner 19 should be sufficient to allow for radial flaring as shown in FIG. 1.

Figure 4:
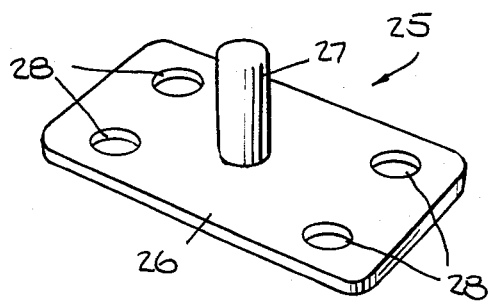
FIG. 4 is a perspective view of the anchor.

At each of the two diametral points, only one of which, the point 24, is seen in FIG. 2, relative to the run section 21, located in the plane passing through the longitudinal axis of section 21 and normal to the longitudinal axis of stack section 22, there is embedded a metal anchor 25 constructed as shown in FIG. 4. The anchor 25 consists of a metal plate 26 and a metal stud 27, the latter being joined to the plate 26 by welding. The plate 26 is provided with a series of apertures or perforations 28.

Figure 3:
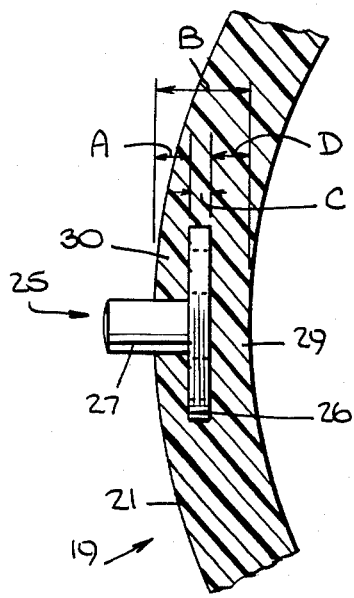
FIG. 3 is a circumferential sectional view taken along the line 3—3 in FIG. 2 showing details of the anchor.

The dimensions of the anchor 25 and its relative position in the wall of the liner 19 are best seen in FIG. 3. As shown, the plate 26 is completely embedded in the material of liner 19 while the stud 27 projects outwardly and above the radially outer surface of liner 19. Bearing in mind that the exposed portion of stud 27 will be joined in this example by welding to the surrounding metal housing when assembled therewith, dimension A should be chosen with the objective of seeking the minimum thickness that will afford, for the material involved, adequate strength to resist pulling out of the anchor 25 when the liner 19 is subjected to vacuum service. The dimension C, the thickness of plate 26, should be sufficient to afford the necessary mechanical strength to resist bending of the plate 26 when high stress due to vacuum is applied to the liner 19. The thickness represented by dimension D is determined by the contemplated service requirements for corrosion, erosion and abrasion resistance and the like. Dimension B is a function of the cumulative requirements for A, C and D.

Under vacuum service, the stud 27 will be placed under tension and its diameter is selected to resist rupture under such conditions. The length of stud 27 will be discussed later.

The perforations 28 are provided in plate 26 to ensure that the plastic of liner 19 is tied to the anchor 25 and that the layers 29 and 30, both radially inward and outward of plate 26, are joined together. The strength of the assembly for a given wall thickness of plastic is greatly increased as a consequence of joining layers 29 and 30. The shape of plate 26 can be varied as desired so along as it will perform the function attributed to it herein.

The tee fitting 10 of FIG. 1 is constructed by taking the liner 19 and assembling over its run and stack sections the corresponding stub ends 11, 12, and 13, each previously assembled with the respective flanges 16, 17 and 18. It will be understood that the stub ends 11, 12 and 13 will previously have been formed each with a flange or flare at one end and with a welding edge, i.e., the usual chamfered or beveled edge, at the other end. Departing from conventional practice, however, the welding edges of stub ends 11 and 12 are provided with notches, preferably cylindrical, at the appropriate complementary positions for accommodating the projection of the anchor stud 27 into the welding area as best seen in FIG. 5.

Referring to FIG. 5, there is shown the welding edge 31 of the housing run stub end 12 having a surface 32 that is normal to the longitudinal axis of stub end 12 and having a beveled surface 33. Into the edge 31 is formed the notch 34 that cooperates with a complementary notch (not shown) in stub end 11 to accommodate stud 27. It should be observed that stud 27 should be long enough to project into the vee region that will be filled with welding metal and will contain the weld puddle during the welding operation. The top of stud 27 should be below the O.D. of the metal housing but above the break line 35 where the bevel 33 begins. If the weld is properly formed it should appear generally as shown in FIG. 6. Preferably, the weld is controlled or other means provided such that thermal degradation of the liner 19 is minimized or avoided. One approach is to ensure that the weld does not penetrate too far below break line 35.

Fittings have been constructed as described above using housing stub ends of steel with the anchor 25 also constructed of steel. Satisfactory welds were made with metal inert gas welding equipment.

With reducing fittings where the small branch is no greater than 6" and the larger branch no greater than 8", it is believed that two anchors located as described above will be sufficient. With larger diameter stacks and runs it may be necessary to include additional anchors with the studs thereof located at the intersection of seams 14 and 15, or elsewhere, in FIG. 1.

Figure 7:
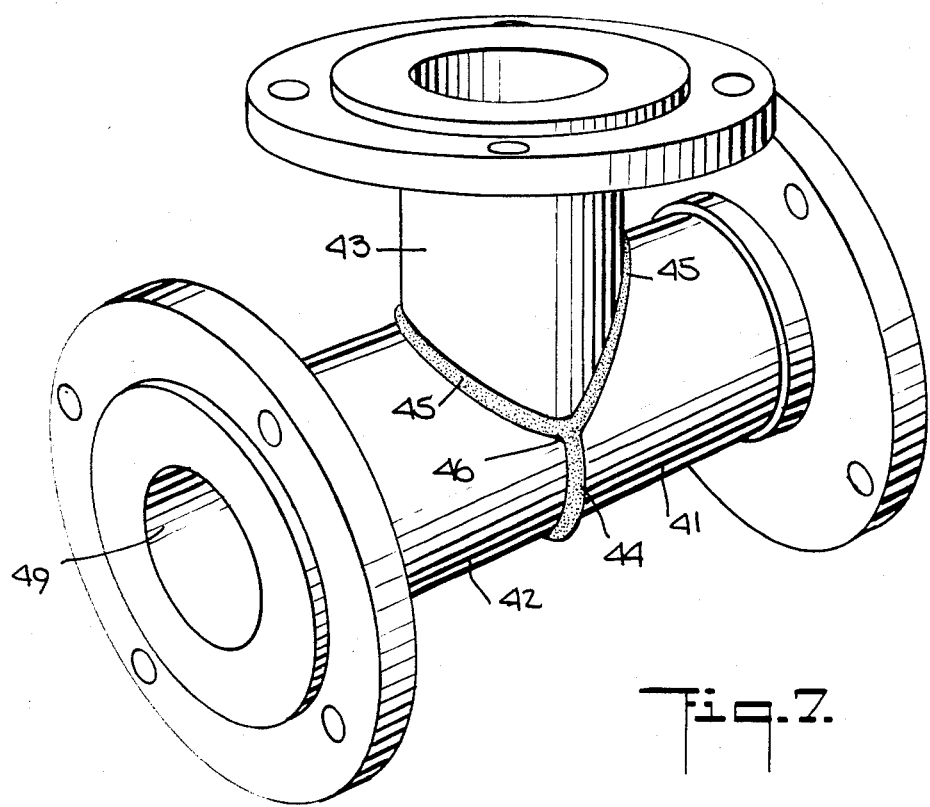
FIG. 7 is a perspective view of a standard tee embodying the present invention.

The invention is not restricted to reducing tee fittings but is equally beneficial with standard tees such as shown in FIG. 7, and with crosses, a standard form being shown in FIG. 8. Referring first to FIG. 7, the standard tee has a metal housing formed from run stub ends 41 and 42 and a stack stub end 43, joined by seam welds 44 and 45. The seams 44 and 45 intersect at the point 46 on the side of the fitting seen in the drawing and at a similar point, not visible, on the opposite side of the fitting. The stud 27 of one of the anchors 25 is welded into the seam at the point 46 and another anchor stud 27 is similarly welded into the seam at the opposite point described above. The liner 49 for the fitting in FIG. 7 is constructed similar to the lining 19 but with run and stack sections of equal diameter. In all other respects, the fitting of FIG. 7 is similar to that described with reference to FIG. 1.

In FIG. 8 there is shown a cross fitting 50 constructed in a similar manner to the tee fittings previously described. Preferably, two anchors will be incorporated in the liner 51, one on each side such that the studs coincide with the intersection points of the seam welds of which the point 52 appears in the drawings. The second point is diametrically opposite.

As mentioned above, the liners for the fittings are isostatically molded, and this is accomplished in precision molds outside of the eventual housing. This method is preferred for resins such as PTFE because the raw material cost for isostatic molding is less than that for extrusion molding. A further advantage of preforming the liner is that it can be inspected for wall integrity and required wall thickness. This cannot be done reliably when the liner is molded directly in the eventual housing. All in all the isostatic molding method is more economical.

Use of the anchors described herein permits use of liners with thinner walls and ensures structural integrity under high vacuum service. Plastics other than PTFE such as FEP, PVDF, PFA and PP (fluorinated ethylene propylene, polyvinylidene fluoride, perfluoroalkoxy and polypropylene) can also be used to fabricate fitting liners with anchors as described herein. The housing can be constructed of any suitable metal that can be welded.

The construction described to this point is well suited for fittings where the housings are produced in sections and then welded together. However, the concept is readily extendable to pipe spools and other fitting constructions yielding greater economy of production costs and more reliable vacuum service.

Referring to FIGS. 1 and 2, it is possible to offset the anchors along the axis of the run section 21 of the liner 19 so as to no longer coincide with the seam line 14 between housing sections 11 and 12. In such case the housing wall can be furnished with an aperture through which the anchor stud can project. See FIG. 9 wherein a section of housing wall 60 is provided with an aperture 61. The anchor has a plate 62 embedded in the lining material 63 to which plate is joined a stud 64 extending radially beyond the outer surface of the lining a distance sufficient to pass through aperture 61 whereupon the projecting end is welded at 65 to the housing wall 60.

The construction described with reference to FIG. 9 also can be used to secure the non-metallic lining to the wall of a pipe spool or elbow or the like. All that is required is to locate anchors in the molded plastic liners at suitable intervals and provide corresponding apertures in the housing.

Instead of welding the anchor stud as shown with reference to FIG. 9, various other fastening arrangements can be employed. Thus, in FIG. 10 a barbed washer 66 secures the stud 67; and in FIG. 11 a snap ring 68 engaged in an annular groove 69 performs the equivalent function. In FIG. 12, a cotter pin 70 passes through a transverse bore 71, while in FIG. 13 the exposed end 72 of stud 73 is formed as a rivet with a counterbore 74 and with the edge upset, as shown. In FIG. 14, staking is employed, the stud 75 being provided with a radially extending lip 76 by radially spreading the exposed end with a conical wedge. Another arrangement is shown in FIG. 15 wherein the stud 77 has its outer end threaded externally at 78 and secured by a threaded nut 79.

With all of the embodiments described with reference to FIGS. 9 to 15, assembly of the molded liner within the metal housing requires either that the liner be sufficiently yieldable that it can be deflected radially inwardly at the locations of the anchors as the liner is inserted in its housing until the anchor studs come into registration with the corresponding apertures in the housing and can pass through the same, or that the housing be in sections and be assembled about the liner. If neither of the foregoing is possible or acceptable, resort may be had to the embodiment of FIG. 16. In this embodiment the anchor is in two parts with the plate 80 and its integral boss 81 containing an internally threaded bore embedded in the liner 82, while the stud portion is in the form of a screw or bolt 83. The screw has a head 84 (this can be slotted, hexagonal, round, flat or of any other known configuration) outside of the housing wall 85, and a body shank 86 extending inwardly through aperture 87 in wall 85 for threaded engagement with the threaded bore in boss 81. With this latter construction the liner can be drawn or pressed into place in a housing until the boss 81 comes into registration with the aperture in the housing wall whereupon the screw 83 is inserted and threadedly engaged.

The principle underlying the embodiment of FIG. 16 can be extended to the embodiments of FIGS. 9 to 15. Thus, as exemplified in FIG. 17, the stud 88 can be formed separately from the plate 89, the latter being provided with an internally threaded and integrally secured boss 90. The inner end of stud 88 is externally threaded for threaded engagement in the threaded bore of boss 90. This modification can be applied to any of the studs shown in FIGS. 9 to 15 to permit slipping a liner, without deformation, directly into its associated housing.

In all other respects the anchors described with reference to FIGS. 9–17 can be constructed and embedded in the same fashion as described with reference to FIGS. 1 to 8.

It should be understood that where fastening of the anchor to the housing is accomplished by other than welding, it is not necessary to construct any part of the anchor of metal. Instead, either the anchor plate or the stud or both can be fabricated from a suitable non-metallic material. The same is true of the fastening member.

Having described the present invention with reference to the presently preferred embodiments thereof, it should be apparent that various changes in construction and detail can be incorporated without departing from the true spirit of the invention as defined in the appended claims.

What is claimed is:

1. A component for a lined piping system comprising a metal housing lined with a non-metallic liner of molded material, and at least one structural anchor having a first part embedded and anchored in said liner and having a second part projecting from said liner and secured to said housing, said first part having a portion that extends laterally within said liner relative to said second part with the material of said liner surrounding at least said portion and thereby preventing said first part and liner from separating.

2. A component according to claim 1, characterized in that said housing includes sections joined by welded seams, and said second part of said anchor is welded into one of said seams.

3. A component according to claim 2, characterized in that said molded material is a thermoplastic substance.

4. A component according to claim 1, characterized in that said molded material is a thermoplastic substance.

5. A component according to claim 2, characterized in that said housing comprises at least one run portion formed from two sections, welded seams joining said sections in said housing with said sections being joined to each other at least at two substantially diametral points on opposite sides of the run flow passage, and two of said anchors are anchored in said liner with their respective second parts each welded into said seams at a different one of said diametral points 6. A component according to claim 5, characterized in that said housing is in the form of a fitting selected from the group consisting of tees, crosses and wyes.

7. A component according to claim 4, characterized in that said second part of said anchor is welded to said housing.

8. A component according to claim 1, characterized in that said second part of said anchor projects through an aperture in a wall of said housing and is secured to said housing by a barbed washer.

9. A component according to claim 1, characterized in that said second part of said anchor projects through an aperture in a wall of said housing and is secured to said housing by a snap ring engaged in a groove in said second part.

10. A component according to claim 1, characterized in that said second part of said anchor projects through an aperture in a wall of said housing and is secured to said housing by a cotter pin passing through a transverse bore in said second part.

11. A component according to claim 1, characterized in that said second part of said anchor projects through an aperture in a wall of said housing and is secured to said housing by an upset portion of its projecting end.

12. A component according to claim 1, characterized in that said second part of said anchor projects through an aperture in a wall of said housing and is secured to said housing by a laterally spread and staked portion of its projecting end which is formed with a radially extending lip.

13. A component according to claim 1, characterized in that said second part of said anchor projects through an aperture in a wall of said housing and is secured to said housing by a threaded portion of its projecting end which portion has a threaded nut assembled thereto.

14. A component according to claim 1, characterized in that said second part of said anchor is in the form of a threaded fastener with a head outside said housing and a shank that projects through an aperture in a wall of said housing, and said first part of said anchor has an internally threaded bore portion in which said fastener shank is threadedly engaged.

15. A method for fabricating a component according to claim 1, comprising in combination the steps of selecting a liner for said component molded of non-metallic material and having at least said one anchor with said first part thereof embedded in said non-metallic material of said liner and said second part projecting from a radially outer surface of said liner, assembling said housing about said liner, and securing said housing to said second part of said anchor.

16. A method according to claim 15, characterized in that said housing is in sections to form a fitting selected from the group consisting of tees, crosses and wyes, and said step of assembling said housing includes assembling said sections of said housing about said liner, and thereafter welding said sections together and to said second part of said anchor to form said housing with said liner anchored thereto.

17. A method according to claim 16, characterized in that said liner is selected with two of said anchors disposed at substantially diametral locations on opposite sides of a run flow passage, said housing sections are assembled about said liner with the said second parts of said anchors disposed between confronting edges of said housing sections, and said edges of said sections are welded together and to said second parts of said anchors.

* * * * *